United States Patent
Harrington et al.

(10) Patent No.: US 10,896,426 B2
(45) Date of Patent: Jan. 19, 2021

(54) SYSTEM AND METHOD FOR DELIVERING DISTRIBUTED SENSOR BASED CONTENT TO CONSUMERS

(75) Inventors: Nathan John Harrington, Cary, NC (US); Harry Luther Hoots, III, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2456 days.

(21) Appl. No.: 12/118,388

(22) Filed: May 9, 2008

(65) Prior Publication Data

US 2009/0282008 A1    Nov. 12, 2009

(51) Int. Cl.
*G06Q 30/00* (2012.01)
*G06Q 30/06* (2012.01)

(52) U.S. Cl.
CPC ......... *G06Q 30/00* (2013.01); *G06Q 30/0601* (2013.01)

(58) Field of Classification Search
CPC ....................................................... G06F 7/00
USPC ....... 707/4, 10, 513.1, 501.1; 705/1, 1.1, 14, 705/26; 709/225, 219, 228
See application file for complete search history.

(56) References Cited

U.S. PATENT DOCUMENTS

| | | | |
|---|---|---|---|
| 6,950,198 B1 * | 9/2005 | Berarducci | ........ G06Q 30/0601 358/1.12 |
| 7,085,777 B2 * | 8/2006 | Beck | ..................... A01B 79/005 |
| 7,290,011 B2 | 10/2007 | Eldar et al. | |
| 2002/0035522 A1 | 3/2002 | Pilcher | |
| 2005/0108261 A1 * | 5/2005 | Glassy | ..................... G06F 16/29 |

OTHER PUBLICATIONS

NPL Search History Attached.*
Ruiz-Martinez, Antonio, A Payment Framework for Internet Media-on-Demand Services based on RTSP, 2007 4th Annual IEEE Consumer Communications and Networking Conference, CCNC 2007, Jan. 11-13, 2007, p. 965-970, IEEE, LAs Vegas, NV.

* cited by examiner

*Primary Examiner* — John H. Holly
(74) *Attorney, Agent, or Firm* — Schmeiser, Olsen & Watts, LLP; Nicholas L. Cadmus

(57) ABSTRACT

A method, system, and computer program product for receiving distributed sensor based content from content producers in data processing networks. A sensor services controller (SSC) utility manages the processes involved with connecting content producers and consumers through a set of interfaces of a Services Oriented Architecture. The set of interfaces include interfaces for publishing, finding and paying for content created by distributed sensor platform devices. For example, a query interface allows consumers of content to submit content requests to content producers. The SSC utility enables a sensor platform device to expose the device's capabilities to a sensor services controller through a standard "sensor device" interface. Sensor device capabilities include geophysical location (GPS coordinates), digital imaging sensors (optical, infrared, etc.), movement and orientation data (gyroscopic and accelerometer readings). Based on a set of conditions within the consumer's request, the producer acquires and returns the requested content to the consumer.

8 Claims, 3 Drawing Sheets

SYSTEM AND METHOD FOR DELIVERING DISTRIBUTED SENSOR BASED CONTENT TO CONSUMERS

BACKGROUND

1. Technical Field

The present invention generally relates to data processing (network) systems and in particular to data acquisition in data processing systems.

2. Description of the Related Art

Current information gathering approaches for news related information and data acquisition utilize one of two main approaches for delivering content to consumers. The first approach involves use of customized and expensive hardware paid for by the content producers. Examples of this hardware are television news trucks and seismological measuring devices spread throughout a geographical area. The second approach relies on third parties to share recorded data regarding a desired event. This second approach is generally a time consuming and unrewarding process for the consumer and the producer of content. An example of this approach includes home video of a news event mailed to a television station for eventual rebroadcast after a contract for video usage is negotiated.

Many of the known solutions for data acquisition by content consumers involve the provision of distributed sensor platforms to content producers. However, many of these solutions have prohibitively high startup and operational costs.

SUMMARY OF ILLUSTRATIVE EMBODIMENTS

Disclosed are a method, system, and computer program product for receiving distributed sensor-based content from content producers in data processing networks. A sensor services controller (SSC) utility manages the business processes involved with connecting content producers and consumers through a set of interfaces of a Services Oriented Architecture. The set of interfaces include interfaces for publishing, finding and paying for content created by distributed sensor platform devices. For example, a query interface allows consumers of content to submit content requests to content producers. The SSC utility enables a sensor platform device to expose the device's capabilities to a sensor services controller through a standard "sensor device" interface accessible to the content producer. Sensor device capabilities include geophysical location (GPS coordinates), digital imaging sensors (optical, infrared, etc.), movement and orientation data (gyroscopic and accelerometer readings). Based on a set of conditions within the consumer's request, the content producer acquires and returns the requested content to the consumer.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
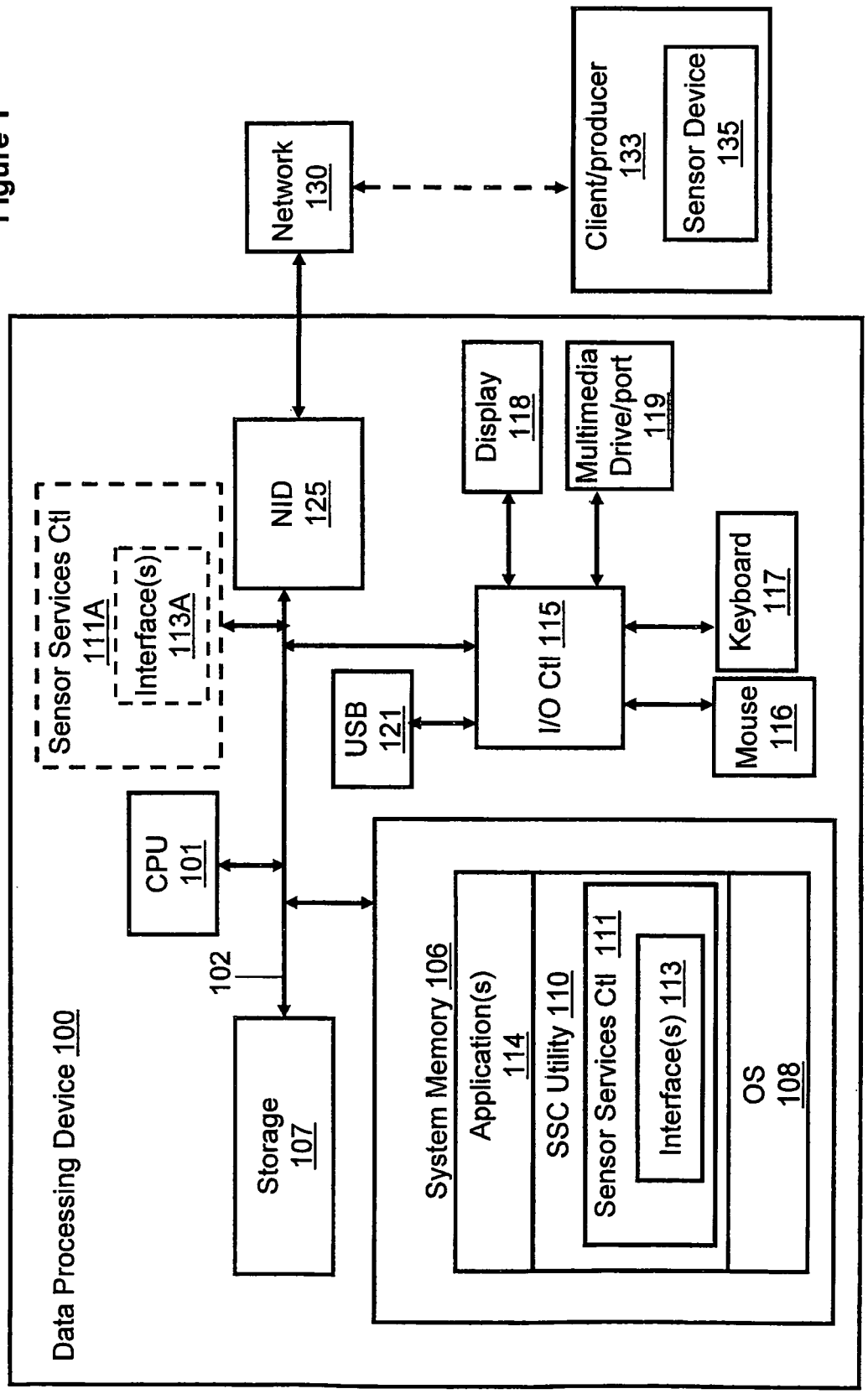
FIG. 1 is a block diagram representation of a data processing system, according to one embodiment.

The illustrative embodiments provide a method, system, and computer program product for receiving distributed sensor-based content from content producers in data processing networks. A sensor services controller (SSC) utility manages the business processes involved with connecting content producers and consumers through a set of interfaces of a Services Oriented Architecture. The set of interfaces include interfaces for publishing, finding and paying for content created by distributed sensor platform devices. For example, a query interface allows consumers of content to submit content requests to content producers. The SSC utility enables a sensor platform device to expose the device's capabilities to a sensor services controller through a standard "sensor device" interface accessible to the content producer. Sensor device capabilities include geophysical location (GPS coordinates), digital imaging sensors (optical, infrared, etc.), movement and orientation data (gyroscopic and accelerometer readings). Based on a set of conditions within the consumer's request, the content producer acquires and returns the requested content to the consumer.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the terms "content consumer" and "consumer" are equivalent parameters and all refer to entities that make specific requests for data. The terms "content producer" and "producer" are equivalent parameters and all refer to entities that obtain and provide requested data to the consumer. The consumers may also be responsible for further dissemination of the data received from the content producers.

With reference now to FIG. 1, there is depicted a block diagram representation of a data processing device (and connected network). DPD 100 comprises at least one processor or central processing unit (CPU) 101 connected to system memory 106 via system interconnect/bus 102. Also connected to system bus 102 is I/O controller 115, which provides connectivity and control for input devices, of which pointing device (or mouse) 116 and keyboard 117 are illustrated, and output devices, of which display 118 is illustrated. Additionally, a multimedia drive 119 (e.g., CDRW or DVD drive) and USB (universal serial bus) hub 121 are illustrated, coupled to I/O controller. Multimedia drive 119 and USB hub 121 may operate as both input and output (storage) mechanisms. DPD 100 also comprises storage 107, within which data/instructions/code may be stored.

DPD 100 is also illustrated with a network interface device (NID) 125, with which DPD 100 connects (via a wired or wireless connection) to one or more clients/producers 133 via access network 130, such as the Internet. In the described embodiments, network 130 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), a virtual private network (VPN), or other wide area network (WAN) other than the Internet, for example.

In one embodiment, DPD 100 is illustrated with Sensor Services Controller 111A which is also connected to system bus 102. Furthermore, Sensor services controller 111A is illustrated as a component having both hardware and software elements. In yet another embodiment, Sensor services controller 111 is illustrated as a software component contained within SSC utility 110 in memory 106. Interface 113 is illustrated within Sensor services controller 111. The Sensor services controller (111,111A) facilitates the processes involved with connecting content producers (133) and consumers (100) through a set of interfaces (113,113A) (included within sensor services controller 111A) of a services oriented architecture. The set of interfaces 113 include interfaces for publishing, finding and paying for content created by distributed sensor platform devices (133).

Notably, in addition to the above described hardware components of DPD 100, various features of the invention are completed via software (or firmware) code or logic stored within memory 106 or other storage (e.g., storage 107) and executed by CPU 101. Thus, illustrated within memory 106 are a number of software/firmware components, including operating system (OS) 108 (e.g., Microsoft Windows®, a trademark of Microsoft Corp, GNU®/Linux®, registered trademarks of the Free Software Foundation and Linus Torvalds, or AIX®, a registered trademark of IBM), applications 114, and sensor services controller (SSC) utility 110. In actual implementation, applications 114 and SSC utility 110 may be combined as a single application collectively providing the various functions of each individual software component when the corresponding code is executed by the CPU 101. For simplicity, SSC utility 110 is illustrated and described as a stand alone or separate software/firmware component, which provides specific functions, as described below.

CPU 101 executes SSC utility 110 as well as OS 108, which supports the user interface features of SSC utility 110. In the illustrative embodiment, SSC utility 110 generates/provides several graphical user interfaces (GUI) to enable user interaction with, or manipulation of, the functional features of the utility (110). Among the software code/instructions provided by SSC utility 110, and which are specific to the invention, are: (a) code for initiating the processes involved with connecting content producers and consumers via a set of interfaces utilized within a services oriented architecture; (b) code for enabling transactions between content consumers and content producers via the set of interfaces; and (c) code for retrieving content from a content producer having a particular set of capabilities. For simplicity of the description, the collective body of code that enables these various features is referred to herein as SSC utility 110. According to the illustrative embodiment, when CPU 101 executes SSC utility 110, DPD 100 initiates a series of functional processes that enable the above functional features as well as additional features/functionality, which are described below within the descriptions of FIGS. 2-3.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Sensor Services Controller 111 is a service oriented architecture component that exposes a set of interfaces 113 including interfaces (to facilitate a set of processes) for publishing, finding and paying for content created by distributed sensor platform devices 133. For example, a consumer requests a picture of a business at a certain address. Sensor Services Controller 111 queries a sensor database for devices equipped with a optical range digital sensor that are in relatively close proximity to the requested business address, and proposes a payment amount to the device's owner. The owner receives payment and transmits the image from the digital sensor to the consumer via Sensor Services Controller 111.

Each sensor platform device owner exposes device capabilities to the sensor services controller through the standard "sensor device" interface (included within interface(s) 113). Common sensor device capabilities include geophysical location (GPS coordinates), digital imaging sensors (optical, infrared, etc.), movement and orientation data (gyroscopic and accelerometer readings), and a wide variety of other useful sensor data. Additionally, each sensor may provide a description of the content currently being delivered through the use of a sensor apparatus. For example, a video interview with a specific individual may be the current content of the sensor apparatus, as published to the sensor services controller interface. Other examples of described content include still images of a building fire, or accelerometer data as reported by the device while on a local commuter train.

SSC utility 110 provides numerous options for consumer level sensor (platform) devices, along with a substantially ubiquitous network connectivity to create a new market for consumers and producers of content. No new hardware (such as digital image sensors) needs to be purchased by the content producers or consumers, as an individual with the right sensor is likely to traverse the required data collection zone with relatively high frequency.

Figure 2:
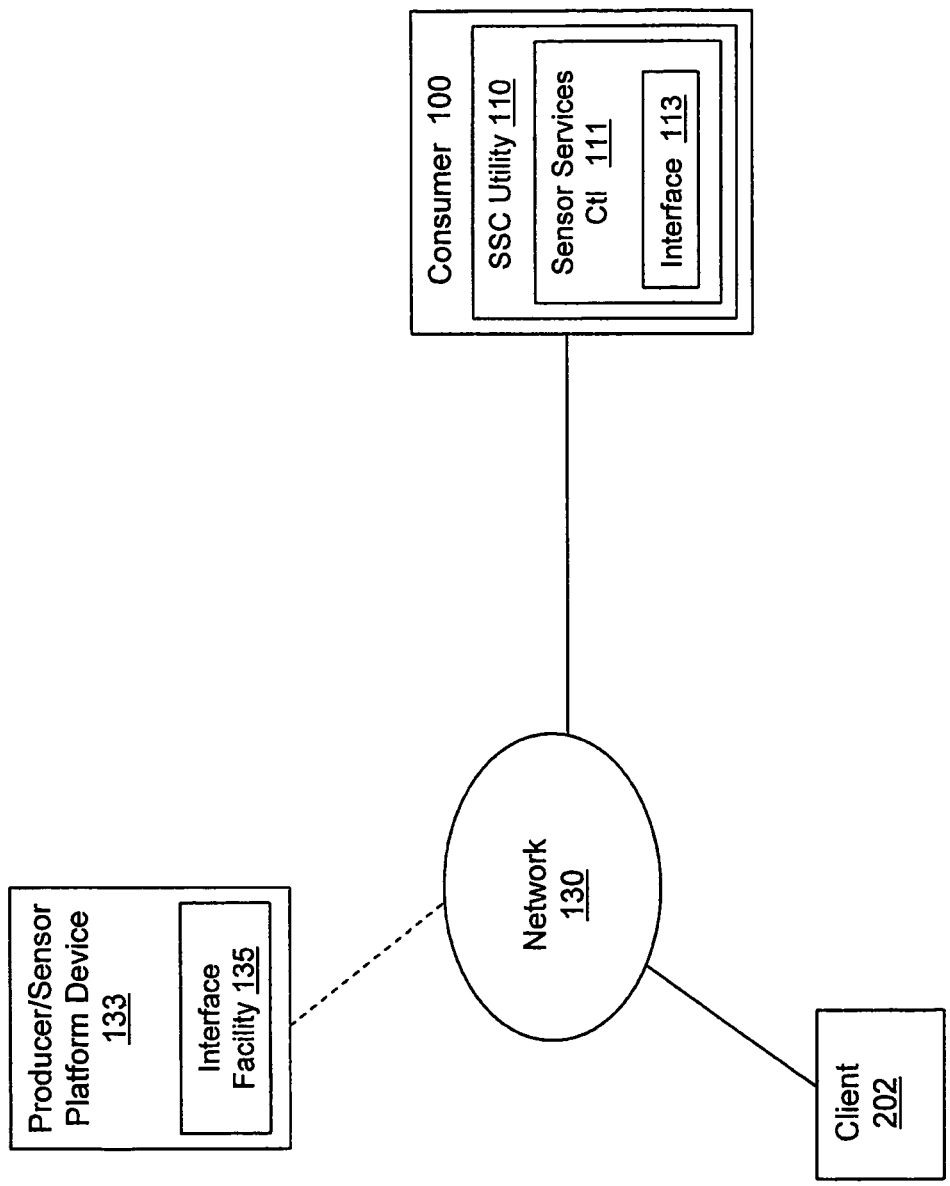
FIG. 2 illustrates a network, in which a content consumer connects with a content producer to execute content transactions, according to one embodiment.

With reference now to FIG. 2, a network in which a content consumer connects with a content producer to execute content related transactions is illustrated, according to one embodiment. Network 200 comprises consumer/server 100 and producer/client 133 which are both connected via example network 130. Producer 133 comprises SSC utility 110. In addition, producer/sensor (platform) device 133 comprises interface facility 135. Interface facility 135 enables producer 133 to access consumer 100 via interface 113. Consumer 100 comprises SSC utility 110 which further comprises sensor services controller 111 and interface 113.

In network 200, Sensor Services Controller 111 handles connecting content producers and consumers through a set of interfaces utilized within a Services Oriented Architecture. The following examples illustrate the interactions of consumers and producers related to the acquisition of content data.

A mobile phone with a digital camera and an on-board accelerometer (e.g., an Apple iPhone) represents an example of a sensor (platform) device (133). An accelerometer is a device for measuring acceleration and associated gravity induced reactions. The accelerometer may be used to sense inclination, vibration and shock. However, any device (133) having appropriate sensor capabilities and network capability allowing the device to connect to a content consumer may be used. Examples include a weather station, a nuclear/biological/chemical threat detection system, and a laptop computer (e.g., a Lenovo ThinkPad) with integrated video camera and accelerometer. Additionally, as wireless networking and embedded sensors become less expensive and more ubiquitous, many new sensor platform devices emerge. Automobiles, for example, may be configured with support for the "sensor services controller" interfaces (113) to report on road conditions including pavement irregularities and traffic congestion in geographical areas where such data points are requested by a consumer.

In addition to the "pay per data request" mode which is based on an acceptance of the request by the content producer, other modes of service delivery are enabled by the Sensor Services Controller 111. Content producers (133) may configure sensor platform devices to automatically accept requests from certain organizations for certain types of data. For example, producers 133 may accept all requests from the Department of Motor Vehicles for accelerometer data when traversing a set of coordinates. This automatic acceptance of requests enables automated data acquisition of vehicle dynamics through a construction zone without the installation of expensive external monitoring systems.

Consumers (100) of content may also produce targeted advertisements based on the data returned from the content requests. For example, a content consumer (100) may request accelerometer readings from all vehicles traversing a busy intersection. If sensor platform device enters the intersections' detection area and continues to report a zero acceleration event for an extended duration, the content consumers (100) may automatically send an advertisement to that sensor platform for vehicle mechanical services or a taxi cab service.

Another example comprises an individual/consumer (100) driving east on interstate 40 at mile marker 280. This consumer encounters stalled traffic and wants to determine if the traffic is moving again by mile marker 285. The consumer (100) requests accelerometer readings from sensors (vehicle or mobile phone mounted) in the geographical area near mile marker 285. The accelerometer readings received are predominantly near zero so the individual/consumer (100) exits the interstate knowing the traffic is stalled for miles. Consumer 100 pays five cents for each accelerometer reading, yet saves dozens of dollars in efficiency and gasoline money by exiting the highway.

An application of transactions between content consumers and producers is provided by an example in which a television station news director receives a telephone call about an apartment fire. The news station/consumer (100) has no video sensors at the site of the fire, so the news director requests moving digital image data from a sensor listed as being in the coffee shop across the street from the apartment fire. The individual with the sensor (in this case a notebook computer on a wifi network with a on-board video camera), accepts the request and walks outdoors to begin transmitting moving digital images of the apartment fire through the sensor services controller (111) to the requesting news director.

In another example, construction crews rupture a steam line during road repairs. Motorists are stuck in long lines while the area is blocked off and traffic rerouted. As steam line repair units are dispatched, the repair units request audio and digital image sensor data from sensor platform devices (133) in the reported area of the steam line rupture. Individual producers (133) accept the request and record audio of the steam line rupture to indicate general rate of flow, and take pictures of the line and surrounding area to give the approaching gas line repair units situational awareness of the equipment and physical layout of the area prior to the arrival of the repair units.

Another application of the embodiment is provided by an example in which the US geological survey (ISGS) detects an earthquake in the vicinity of San Francisco, Calif. Immediate requests are sent out for all accelerometer sensors to report data continuously. Many sensor platform device owners (such as owners of iPhones and portable laptops) have enabled automated acceptance of accelerometer requests from the USGS, and the sensor devices (133) immediately report back the degree of accelerations (including measured vibrations, shock, etc.) experienced at the respective locations. These points of data may then be used by the USGS to compute the areas of San Francisco most heavily impacted by the earthquake. Thus, more accurate emergency responder dispatching and relief aid logistics are achieved.

Figure 3:
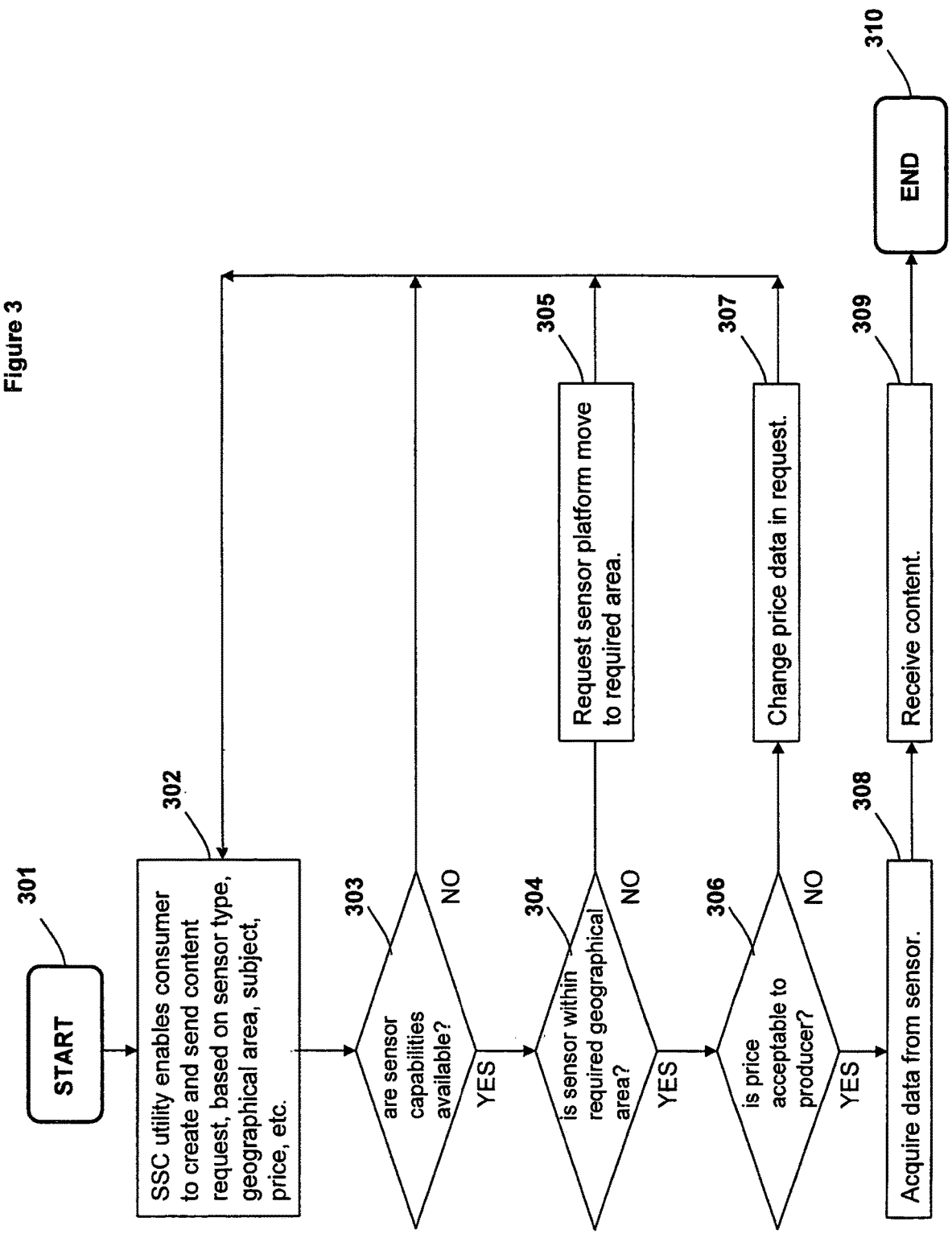
FIG. 3 is a flow chart illustrating the process of delivering sensor-based content to content consumers, according to one embodiment of the invention.

FIG. 3 is a flow chart illustrating a method by which the above processes of the illustrative embodiments are completed. Although the methods illustrated in FIG. 3 may be described with reference to components shown in FIGS. 1-2, it should be understood that this is merely for convenience and alternative components and/or configurations thereof can be employed when implementing the various methods. Key portions of the methods may be completed by SSC utility 110 executing within DPD 100 (FIG. 1) and controlling specific operations of/on DPD 100, and the methods are thus described from the perspective of either/both SSC utility 110 and DPD 100.

The process of FIG. 3 begins at initiator block 301 and proceeds to block 302, at which SSC utility 110 enables a consumer of content to compose a request indicating a type of information which is desired. A typical content request consists of: Geographical Location, Sensor Type, and Price. The sensor services controller then checks a set of databases for a content producer(s) that represents the closest match to the geographical location and sensor type specified in the content request. The request including price and subject information are then transmitted to the producer's sensor platform device. At decision block 303, SSC utility 110 determines whether the producer has the appropriate sensor capabilities to obtain the requested data. If at block 303, SSC utility 110 determines that the producer does not have the appropriate sensor capabilities, SSC utility 110 returns to block 302. In one embodiment, the consumer may retry the request (to the same producer based on a preset number of attempts and a retry interval). In another embodiment, the consumer may send a request to another content producer. If at block 303, SSC utility 110 determines that the producer has the appropriate sensor capabilities, SSC utility 110 proceeds to decision block 304.

At decision block 304, SSC utility 110 determines whether the sensor platform is within the required geographical area. If SSC utility 110 determines that the requested sensor platform is not within the required geographical area, SSC utility 110 proceeds to block 305, at which SSC utility 110 submits a request for the sensor platform to be moved to the required area. Following block 305, the process returns to block 302. If at block 304, SSC utility 110 determines that the sensor platform is within the required geographical area, SSC utility 110 proceeds to decision block 306.

At decision block 306, SSC utility 110 determines whether the suggested cost/price issued by the consumer is accepted to the producer. If at block 304, SSC utility 110 determines that the cost/price issued by the consumer is not accepted by the producer (i.e., by receipt of a notification of price rejection), SSC utility 110 proceeds to block 307, at which SSC utility 110 initiates a change of the price data in the request. In one embodiment, the consumer may submit the request to another producer. Following block 307, the process returns to block 302. If at block 304, SSC utility 110 determines that the price issued by the consumer is accepted by the producer, SSC utility 110 proceeds to block 308, at which (SSC utility 110 receives indication that) data acquisition via the producer's sensor is initiated. Following block 308, the process proceeds to block 309, at which the sensor data/readings are transmitted back to the content consumer. The process ends at block 310.

In the flow charts above, one or more of the methods are embodied as a computer program product in a computer readable medium or containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method, said method comprising:

receiving in real time, by at least one computing device of at least one content producer of one or more content producers from a data processing device of a content consumer, a message request, wherein the at least one content producer satisfies a set of content characteristics and conditions specified in the message request more closely than does any other content producer of the one or more content producers, wherein the at least one content producer is equipped with sensor platform devices in a geographical area, said sensor platform devices comprising hardware sensor devices to provide data content, wherein the hardware sensor devices comprise a first sensor device configured to detect and transmit GPS coordinates at a geophysical location, a second sensor device configured to detect and transmit digital images via a digital camera, third sensors configured to measure acceleration and associated gravity induced reactions and to sense inclination and vibration and shock, fourth sensors configured to detect threat information pertaining to a nuclear, biological and/or chemical threat, and fifth sensors configured to detect weather information, wherein the data content comprises the geophysical location, the digital images, the movement and orientation data, the threat information, wherein the first sensor device is in a GPS coordinate detection device, wherein the second sensor device is in the digital camera, wherein the third sensors are in an accelerometer, wherein the fourth sensors are in a nuclear/biological/chemical threat detection system, wherein the fifth sensors are in a weather station, wherein the message request is a request for the data content from the one or more content producers based on the set of content characteristics and conditions, where the message request specifies the geographical area, wherein a set of interfaces utilized within a services oriented architecture enables transactions between the content consumer and the one or more content producers, and wherein processes involved with connecting the data processing device of the content consumer to the at least one computing device of the one or more content producers through the set of interfaces are enabled;

said hardware sensor devices, in response to the message request, transmitting in real time the data content to the at least one computing device of the at least one content producer via an interface facility by: the first sensor device detecting and transmitting the geophysical location, the second sensor device detecting and transmitting digital images via the digital camera, the third sensors measuring acceleration and associated gravity induced reactions and sensing inclination and vibration and shock, the fourth sensors detecting the threat information pertaining to a nuclear, biological and/or chemical threat, and the fifth sensors detecting weather information; and transmitting in real time, by the at least one computing device of the at least one content producer to the data processing device of the content consumer, the data content.

2. The method of claim 1, said method further comprising:
receiving notification, via a sensor device interface, of sensor device capabilities via the sensor device interface provided by at least one content producer of the one or more content producers.

3. The method of claim 1, wherein said transmitting the message request comprises:
submitting the message request to the one or more content producers via a query interface.

4. The method of claim 1, said method further comprising:
receiving, by the data processing device of the content consumer, a description of the content data at a time of said receiving the content data; and
returning targeted information by the data processing device of the content consumer to at least one content producer of the one or more content producers based on the content data received by the data processing device of the content consumer in response to the message request, wherein said targeted information includes advertisements.

5. A data processing system, said system comprising: at least one computing device of at least one content producer of one or more content producers; and hardware sensor devices, said at least one computing device and said hardware devices configured to perform a method, said method comprising:
receiving in real time, by at least one computing device of the at least one content producer of the one or more content producers from a data processing device of a content consumer, a message request, wherein the at least one content producer satisfies a set of content characteristics and conditions specified in the message request more closely than does any other content producer of the one or more content producers, wherein the at least one content producer is equipped with sensor platform devices in a geographical area, said sensor platform devices comprising the hardware sensor devices to provide data content, wherein the hardware sensor devices comprise a first sensor device configured to detect and transmit GPS coordinates at a geophysical location, a second sensor device configured to detect and transmit digital images via a digital camera, third sensors configured to measure acceleration and associated gravity induced reactions and to sense inclination and vibration and shock, fourth sensors configured to detect threat information pertaining to a nuclear, biological and/or chemical threat, and fifth sensors configured to detect weather information, wherein the data content comprises the geophysical location, the digital images, the movement and orientation data, the threat information, wherein the first sensor device is in a GPS coordinate detection device, wherein the second sensor device is in the digital camera, wherein the third sensors are in an accelerometer, wherein the fourth sensors are in a nuclear/biological/chemical threat detection system, wherein the fifth sensors are in a weather station, wherein the message request is a request for the data content from the one or more content producers based on the set of content characteristics and conditions, where the message request specifies the geographical area, wherein a set of interfaces utilized within a services oriented architecture enables transactions between the content consumer and the one or more content producers, and wherein processes involved with connecting the data processing device of the content consumer to the at least one computing device of the one or more content producers through the set of interfaces are enabled;

said hardware sensor devices, in response to the message request, transmitting in real time the data content to the at least one computing device of the at least one content producer via an interface facility by: the first sensor device detecting and transmitting the geophysical location, the second sensor device detecting and transmitting digital images via the digital camera, the third sensors measuring acceleration and associated gravity induced reactions and sensing inclination and vibration and shock, the fourth sensors detecting the threat information pertaining to a nuclear, biological and/or chemical threat, and the fifth sensors detecting weather information; and transmitting in real time, by the at least one computing device of the at least one content producer to the data processing device of the content consumer, the data content.

6. The data processing system of claim 5, said method further comprising:
receiving notification, via a sensor device interface, of sensor device capabilities via the sensor device interface provided by at least one content producer of the one or more content producers.

7. The data processing system of claim 5, wherein said transmitting the message request comprises:
submitting the message request to the one or more content producers via a query interface.

8. The data processing system of claim 5, said method further comprising:
receiving, by the data processing device of the content consumer, a description of the content data at a time of said receiving the content data; and returning targeted information by the data processing device of the content consumer to at least one content producer of the one or more content producers based on the content data received by the data processing device of the content consumer in response to the message request, wherein said targeted information includes advertisements.

\* \* \* \* \*